April 1, 1924.  
H. RENKEN  
1,489,044  
PHOTO ENGRAVER'S BEVELING MACHINE  
Filed May 3, 1922
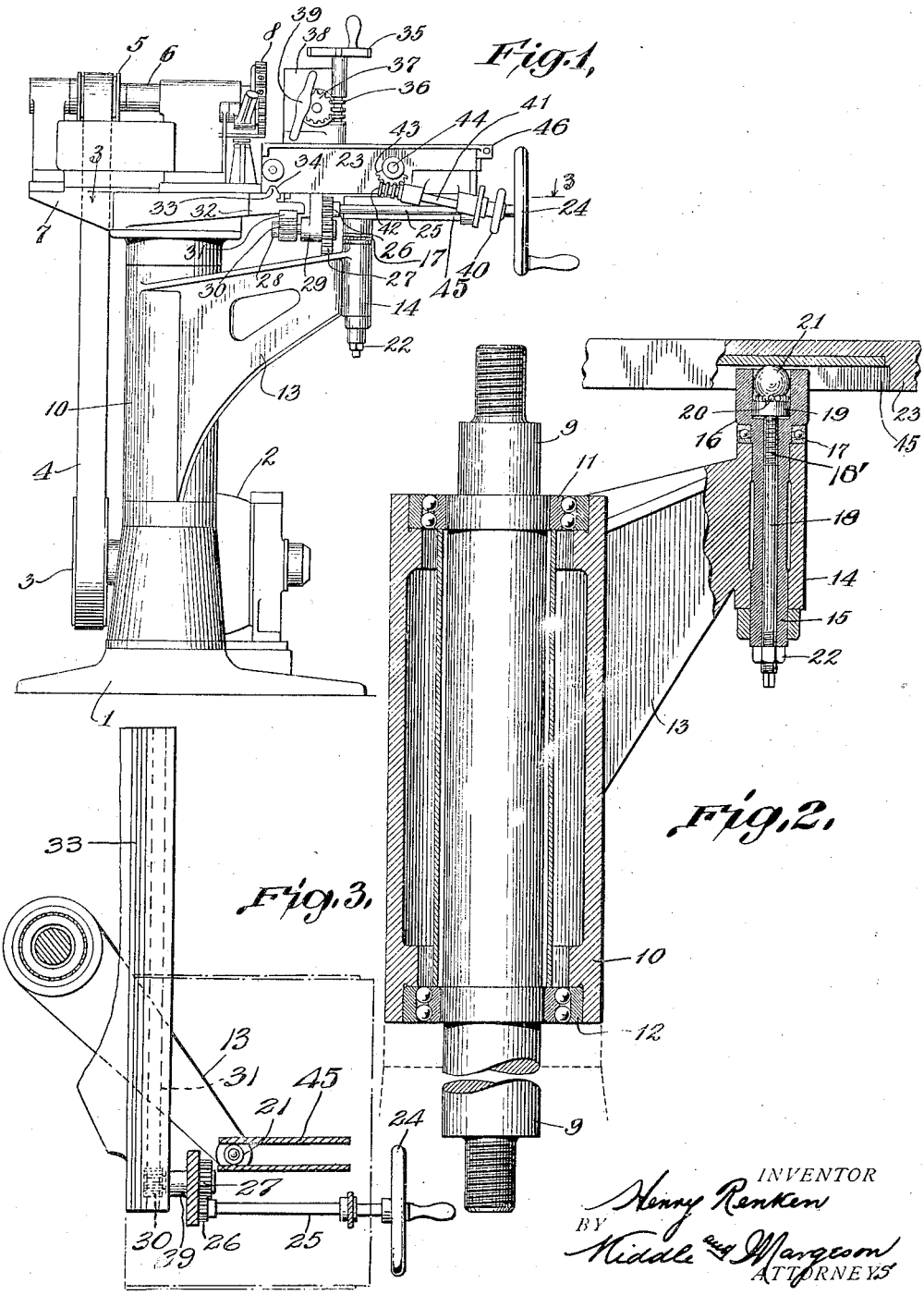

Patented Apr. 1, 1924.

1,489,044

UNITED STATES PATENT OFFICE.

HENRY RENKEN, OF NEW YORK, N. Y., ASSIGNOR TO F. WESEL MANUFACTURING COMPANY, OF BROOKLYN, NEW YORK, A CORPORATION OF NEW YORK.

PHOTO-ENGRAVER'S BEVELING MACHINE.

Application filed May 3, 1922. Serial No. 558,322.

*To all whom it may concern:*

Be it known that I, HENRY RENKEN, a citizen of the United States, and a resident of the county of Queens, in the city and State of New York, have invented certain new and useful Improvements in Photo-Engravers' Beveling Machines, of which the following is a specification.

My invention relates to photo engravers' beveling machines and is particularly directed to the mounting of the work carriage.

Heretofore in the construction of machines of this type the carriage has been mounted upon two horizontally extending rails, one of which is adjacent to the outer edge of the carriage and work table. In such machines when the carriage has reached the end of travel of the cutting stroke across the rails and it is to be brought back again to its original position for the next cut the operator is obliged to reach over this rail in order to grip a handle upon the carriage provided for the purpose of quickly returning the carriage. Also in setting up his work or in changing or adjusting the cutters of the machine the outer rail is in the way.

One of the objects of my invention is to eliminate this inconvenience by providing a structure whereby one rail may be eliminated entirely, thus bringing the operator closer to his work.

Other objects of my invention will also be manifest from the following description and the accompanying drawing in which—

Fig. 1 is a side elevation of a machine embodying my invention; and

Fig. 2 is an enlarged sectional view of my improved construction showing a modified form of table.

Fig. 3 is a view taken on line 3—3 of Fig. 1 looking in the direction of the arrows.

Referring to the drawings in detail, 1 designates a pedestal-supporting base upon which is mounted a motor 2 provided with the usual pulley 3 which is connected by means of a belt 4 to a pulley 5 on a spindle 6 which has its bearing in a head 7 of the pedestal. On one end of said spindle is carried a cutter 8, the purpose and function of which will hereinafter be described.

A shaft or post 9 has one extremity screwed into the base 1 and the other into the head 7. This post carries a sleeve 10 rotatably mounted thereon, this sleeve being mounted in the bearings 11 and 12 at the top and bottom thereof respectively. Integral with or rigidly secured to the sleeve 10 is a swinging arm 13. This arm is provided with a sleeve 14 at its free end carrying a hollow shaft 15, the upper end of which projects beyond the sleeve 14 and is formed into a head 16 which rests upon a ball bearing ring 17 on top of and carried by the sleeve 14. A bolt or rod 18 is threaded into the hollow sleeve 15, as indicated at 18′ the head 19 of this rod extending into a comparatively enlarged opening in the head 16 of the sleeve. This enlarged opening is provided for the reception of ball bearings 20 which rest upon the head of the bolt 18 and a large ball 21 which is carried by the bearings 20. The purpose of this arrangement of the bearings is to insure the rotation of the large ball 21 so as to prevent the formation of flats thereon. But if desired a roller bearing may be substituted for this arrangement. The other end of the bolt 18 is screw-threaded for the reception of a lock nut 22 for the purpose of locking the bolt in adjusted position after the same has been adjusted to position the ball 21 so that the table or carriage 23 may be levelled properly with the axis of the cutter spindle 6.

The carriage 23 is provided with a transverse channel or raceway 45 on the under side thereof within which the head 16 of the hollow shaft 15 carrying the bearings just referred to is freely movable with the carriage riding on the ball 21 and supported by the arm 13. This raceway 45 may be either in the form of a channel secured to the underside of the table, as shown in Figs. 1 and 3, or it may be formed in the underside of the table, as shown in Fig. 2.

A hand wheel 24 is mounted on a shaft 25 which is journaled in the carriage 23; on the other end of this shaft 25 is a gear 26 meshing with another gear 27 mounted on a counter-shaft 28 having its bearing in a projection 29 of the carriage 23. On the other end of the shaft 28 is another gear 30 which is in engagement with a rack 31 rigidly secured to an extension 32 of the head 7. The purpose and function of this arrangement will be set forth hereinafter when the operation of the machine is being described.

This extension 32 just referred to has formed thereon a rail 33 which is adapted to engage a corresponding groove or guideway 34 on the carriage 23 and upon which the said carriage is adapted to slide when the machine is in operation and by which the inside edge of the carriage is supported.

The carriage 23 is provided with a clamping device for clamping the work on the table to the carriage after the same has been set in the desired position. This device comprises a hand wheel 35, worm 36, gear 37 and the clamp proper 38. Secured to this clamp is a handle 39, the purpose of which will hereinafter be explained. The carriage is also provided with a wheel 40 mounted upon a shaft 41 journaled in the carriage and carrying a worm gear 42 at its other end which is in engagement with a segmental gear 43 connected to the under side of the table by suitable means (not shown) for the purpose of laterally moving said table relative to the carriage for adjusting the table after the work has been clamped thereon.

The operation of the machine will now be described.

The motor 2 will transmit motion to the cutter 8 through the medium of the belt 4, pulley 5 and spindle 6 upon which the cutter is mounted. A plate to be beveled (not shown) is placed upon the table 46 and is clamped thereon by the operation of the hand wheel 35. Then by operating the hand wheel 24 motion is imparted through the train of gears 26, 27, 30 and the rack 31 to the carriage so that it will travel along the rail 33 bringing the work into engagement with the cutters in head 8.

The carriage being supported at its outer edge by the arm 13 which is in engagement with the transverse slot or guideway 45 on the under side thereof, it will be obvious that the carriage will have a rectilinear movement while the arm will have oscillatory motion, or motion in the arc of a circle, the slot 45 permitting these relative movements of the carriage and arm.

It will also be obvious that the swinging arm 13 supports the carriage at all points throughout its line of travel and that the arm will at all times be under the carriage and out of the way of the operator.

The carriage is returned by turning the hand wheel 24 in the reverse direction and in order that the return of the carriage may be expedited the hand wheel 24 is spun and then the operator by pulling on the handle 39 (which is secured to the carriage by means of a clamp) may pull the carriage toward its initial position thereby increasing the speed of the return trip.

In former constructions of these machines the outer rail interfered with this part of the operation in that it was impossible for the operator to get into such close contact with these parts of the machine as was desired but this is now made possible by the elimination of the outer rail.

It will be seen from the foregoing that I have so mounted the carriage that it is possible to eliminate the outer rail entirely, thereby enabling the operator to get close to his work at all times. This is of great advantage practically as in machines of this character frequent adjustments are necessary and it is necessary to constantly set up new work.

Without limiting myself to the precise details shown and described, what I claim is:

1. In a beveling machine, the combination of a work-supporting carriage, a rail, a pedestal, and an arm movably attached to said pedestal, said rail and arm supporting said carriage and said work-supporting arm being movable with the carriage.

2. In a beveling machine, a pedestal, an arm rotatable about said pedestal, and a carriage partially supported by said arm and having a guideway for the reception of one end of said arm.

3. In a beveling machine, a pedestal, an arm, one end of which is rotatably attached to said pedestal, a sleeve supported by the other end of said arm, a shaft within said sleeve, bearings carried by said shaft and a carriage supported on said bearings.

4. In a device of the class described, a supporting base, an arm rotatably mounted thereon, a sleeve carried by the free end of said arm, a hollow shaft mounted in said sleeve, bearings in said shaft, a carriage freely mounted upon said bearings and means for adjusting said carriage and bearings vertically.

5. In a device of the class described, a rail, a carriage having a transverse slot in the under side thereof and an arm, one end of which rides in said slot, the other end being rotatably mounted, said carriage being supported by said rail and said arm.

6. In a photo engraver's beveling machine, a support, a stationary rail carried by said support, a carriage mounted on said rail and having a guideway in engagement therewith and a movable support cooperating with said rail said last-named support and rail supporting said carriage.

7. In a device of the class described, a rail, a carriage having rectinlinear motion on said rail and an arm having oscillatory motion, said rail and said arm co-operating with each other to support said carriage.

8. In a device of the class described, a supporting base, a shaft secured to said base, a sleeve revolvably mounted on and supported by said shaft, bearings at the top and bottom of said sleeve, an arm carried by said sleeve, a rail, and a carriage supported by said arm and said rail.

9. In a device of the class described, a rail, a carriage mounted thereon and movable relatively thereto, and means beneath said carriage co-operating with said rail to support the carriage, said means having curvilinear motion and movable with said carriage.

10. In a device of the class described, a rail, a movable carriage, and a movable support co-operating with said rail to support said carriage, said rail lying beneath said carriage at all times.

11. In a machine of the class described, the combination of a post for supporting the machine, a carriage, a rail for receiving and supporting the inner edge of the carriage, a sleeve rotatably mounted on said post, anti-friction bearings for the sleeve at the top and bottom thereof, a bracket rigid with said sleeve, a sleeve at the outer end of said bracket, a second sleeve within the last-mentioned sleeve provided with a head received by a transverse slot in the under side of said carriage, anti-friction bearings received by said head and supporting said carriage, and means for effecting a simultaneous vertical adjustment of said head, the bearings therein and said carriage.

This specification signed this 2d day of May, 1922.

HENRY RENKEN.